(12) United States Patent
Chellemi et al.

(10) Patent No.: US 7,197,993 B2
(45) Date of Patent: Apr. 3, 2007

(54) UNDER BED FUMIGATOR

(75) Inventors: Daniel O. Chellemi, Vero Beach, FL (US); John Mirusso, Delray Beach, FL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 10/263,107

(22) Filed: Oct. 3, 2002

(65) Prior Publication Data

US 2004/0065240 A1 Apr. 8, 2004

(51) Int. Cl.
*A01C 23/00* (2006.01)

(52) U.S. Cl. .................................................. 111/121

(58) Field of Classification Search ............... 111/118, 111/119, 120, 121, 122, 127, 129, 900
See application file for complete search history.

(56) References Cited

U.S. PATENT DOCUMENTS

| | | | |
|---|---|---|---|
| 4,092,112 A | 5/1978 | Calkins et al. | |
| 4,656,957 A | 4/1987 | Williamson et al. | |
| 5,495,814 A | 3/1996 | Primus | 111/124 |
| 5,609,114 A | 3/1997 | Barton | 111/167 |
| 5,957,219 A | 9/1999 | Friggstad | 172/395 |
| 6,029,590 A | 2/2000 | Arriola et al. | 111/124 |
| 6,167,821 B1 | 1/2001 | Beggs | 111/124 |

OTHER PUBLICATIONS

Yetter Professional Solutions, Advertisement Flyer, "Maximize Fumigant Effectiveness.", date unknown.

Yetter Manufacturing Co., "Yetter . . . for land's sake", *30" Avenger Coulter Operators Manual with Parts Identification*, pp. 1-28, date unknown.

W. O. Miller et al., "The Dow Soil Injection Knife for Applying Chemicals to Bedded Land", *The Dow Chemical Company—Down to Earth*, pp. 18-20, Fall 1967.

D. Wang et al., "Spatial and Temporal Distributions of 1,3-Dichloropropene in Soil Under Drip and Shank Application and Implications to Pest Control Efficacy Using Concentration-Time Index", *Tektran, United States Department of Agriculture, Agricultural Research Service*, pp. 1, 2002.

L. Klein et al., (Meeting), "Telone EC as a Possible Alternative to Methyl Bromide", pp. 264.

V. Cebolla et al., "Methyl Bromide Alternatives on Horticultural Crops", *Acta Hort.*, vol. 532, pp. 237-242, 2000.

J. J. Stapleton et al., "Effect of Soil Solarization and Telone II on Plant—Parasitic Nematodes in California Soils", *Phytopathology*, (179) pp. 952.

M. Rieger et al., "Solarization and Chemical Alternatives to Methyl Bromide for Preplant Soil Treatments of Strawberries", *Hortechnology*, vol. 11, (2) , pp. 258-264, Apr.-Jun. 2001.

C. R. Camp et al., (Abstract), "Subsurface Drip Irrigation—Past, Present, and Future", Proceedings of the 4th Decennial National Irrigation Symposium, pp. 363-372, Nov. 14-16, 2000.

(Continued)

*Primary Examiner*—Christopher J. Novosad
(74) *Attorney, Agent, or Firm*—John D. Fado; Gail E. Poulos (57) ABSTRACT

Plastic mulched raised beds are fumigated using a fumigation system containing two opposing armatures affixed to a mounting arm at about a 15° angle and a blunt-ended knife with a blade attached at about a 90° angle to the knife. The system allows fumigant to be applied to the interior of the raised, plastic mulched beds without disturbing the mulch.

6 Claims, 12 Drawing Sheets

OTHER PUBLICATIONS

R. C. Schneider et al., "Management of the Fumigant 1,3-Dichloropropene in Hawaii Pineapple", *Acta Horticulturae*, vol. 425, pp. 443-456.

J. J. Stapleton et al., "Solarization and biofumigation help disinfest soil", *California Agriculture*, vol. 54, (6), pp. 42-45, Nov.-Dec. 2000.

T. Trout et al., "Strawberry Response to Fumigants Applied by Drip Irrigation Systems", *USDA-ARS, Water Man. Res. Lab.*, pp. 1-3 & pp. 1-2, date unknown.

D. O. Chellemi et al., "Effects of Soil Solarization and Fumigation on Survival of Soilborne Pathogens of Tomato in Northern Florida", *Plant Disease*, vol. 78, (12), pp. 1167-1172, Dec. 1994.

UNDER BED FUMIGATOR

BACKGROUND OF THE INVENTION

1. Field of the Invention

The present invention relates to an apparatus and method for fumigating soil under raised planting beds that are covered with plastic mulch.

2. Description of the Related Art

Soilborne pests and pathogens, including weed propagules, nematodes, insects, fungi, bacteria and certain other agents, can be limiting factors in the production of crops. One of the principal strategies used by growers of high-value horticultural crops to combat these organisms is to disinfest soil prior to planting, using pesticides or other physical or biological methods. Soil fumigants are the most effective soil disinfestation chemicals, and methyl bromide (MB) is the most important soil fumigant chemical used by growers around the world. It is a broad-spectrum pesticide with excellent activity against most potential soil pests (Stapleton et al., California Agriculture, Vol. 54 (6), 42–45, December 2000).

In production systems where polyethylene plastic is used as a mulch, preplant application of chemical fumigants is the principal method employed for control of soilborne pests. In Florida, for example, approximately 4.9 million Kg of methyl bromide were applied to 20,000 ha of tomato (*Lycopersicon esculentrum* Mill.) during 1990 to control soilborne pests (Anonymous, USDA NAPIAP, April, 1993; Anonymous, Fla. Dep. Agric. Consum. Serv., 1993). Increased social and legislative pressure to restrict the use of chemical fumigants has created the impetus to evaluate alternative approaches for management of soilborne diseases which minimize their impact.

Chellemi et al. (Plant Disease, Volume 78 (12) 1167–1172, December 1994) studied the effects of soil solarization using a photoselective polyethylene film, soil fumigation, and combinations of the two on survival of four soilborne plant pathogens in field plots in Northern Florida, and found that soil solarization alone resulted in a significant decrease in the density of *Phytophthora nicotianae* and *Pseudomonas solanacearum* down to a depth of about 25 and 15 cm. respectively. Significant reductions in the density of *Fusarium oxysporum radicis-lycopersici* and *F.o. lycopersici* following soil solarization occurred only in the upper 5 cm of soil. Fumigation significantly reduced populations of *Phytophthora nicotianae*, *F.o. radicis-lycospersici*, and *F.o. lycopersici* down to a depth of 35 cm. The effect of fumigation on *P. solanacearum* was highly variable. Additional reductions in the density of *P. solanacearum* were achieved when solarization was combined with fumigation. Synergistic effects between soil solarization and chemical or organic amendments that resulted in additional reductions of pathogen populations have been observed for other soilborne pests (Frank et al., Crop Prot., Vol. 5, 199–202, 1986; Gamliel et al., Plant Dis., Vol. 77, 886–891, 1993; Gamliel et al, Phytopathology, Vol. 83, 899–905, 1993).

Various systems and apparatus have been devised for injecting chemical fumigants into soil or spraying fumigants onto the soil surface and then sealing the fumigants using tarpaulins or foams. However, problems associated with fumigant emission from the soil have resulted in a loss of their effectiveness, disruption to the environment, and have posed heath risks to workers in the field.

Other methods for applying fumigants include drip irrigation, where a water soluble formulation is applied to soil with irrigation water through the same irrigation systems that are later used to irrigate the crops. The amount of water used to apply the fumigants, application rates, and soil conditions during application determine the success of these fumigants in controlling soil pathogens and weeds.

U.S. Pat. No. 3,640,234 (Carroll et al., Feb. 8, 1972) discloses a fumigant injection apparatus which forms, fills and seals capsules of volatile fumigants at least 3 feet underground allowing the fumigant to diffuse through the soil and control pests and prevent fumigant escape into the atmosphere.

U.S. Pat. No. 3,964,405 (Haglund et al., Jun. 22, 1976) discloses the use of spot penetration injectors, special furrowing equipment, and utilization of tooth or chisel applicators generally attached to cultivators to deeply place fumigants into the soil at about 14–24 inches below ground level.

U.S. Pat. No. 6,167,821 (Beggs, Jan. 2, 2001) discloses a device for applying fumigant below the surface of the soil and includes a soil leveling apparatus, and a soil packer. The apparatus further includes a cover crop seed planter located behind the soil leveling apparatus. The device includes a conventional fumigant applicator which is capable of applying fumigant to the soil at a depth of about 2 to 12 inches below the top surface of the soil. The fumigating portion of the device consists of multiple chisel plows including an elongated tine with a conventional chisel tip. A stainless steel fumigant supply conduit with a spray nozzle at the end is connected to the tine so that the nozzle is approximately halfway down the tine length. When the chisel is lowered to a depth of about 10 to 12 inches, the sprayer is at a depth of about 4 to 8 inches allowing spray to reach the bottom of the chisel.

Miller et al.(Down to Earth, 18–20, Fall 1967) describe a soil injection knife for applying fumigants to bedded land. The blade of the chisel knife is designed so that it sweeps down and back from the tool bar forcing stalks and other crop debris down and off the tip of the blade as it passes through the soil. The knives enter the side of a bed about three inches above the bottom of the furrow. The tips of the knives are about 12 inches apart during fumigant application. This requires approximately 15½ inches insertion into the bed. The tips of the blades are then about 6 inches off center of the bed. Each knife contains drill holes for spraying fumigant.

While various methods and apparatus are used for applying fumigants to soil, there remains a need for methods and apparatus for fumigation which inject fumigants under raised planting beds that have been previously covered with plastic mulch. The present invention provides a device for fumigation under existing raised, plastic-mulched beds without the use of drip irrigation which solves some of the problems of the prior art.

SUMMARY OF THE INVENTION

It is, therefore, an object of the present invention to provide a fumigation system that will fumigate plastic mulched beds without disturbing the plastic mulch or the soil profile.

A further object of the present invention is to provide a fumigation system that includes two opposing armatures that are adjustably attached to the toolbar of a tractor and are adjustable to compensate for various bed widths.

A still further object of the present invention is to provide a fumigation system wherein each armature is attached to a mounting arm at about a 15° angle from vertical.

A further object of the present invention is to provide a fumigation system having a knife comprising a contoured surface, a blunt tip, and a blade attached to said knife wherein said blade has an inner edge that is a double kerf.

Another object of the present invention is to provide a method for fumigating plastic mulched beds comprising driving a tractor at a speed useful for fumigating soil, wherein said tractor has attached to its toolbar a pair of opposing armatures mounted at about a 15° angle onto a mounting arm and the armatures further include a blunt-tipped knife containing a blade attached at about a 90° angle to said knife, wherein said knife and blade have a feed tube attached to the outer edge for delivery of fumigant from a conduit attached to a fumigant containing tank mounted on said tractor.

A still further object of the present invention is to provide a method for fumigating plastic mulched beds wherein said fumigant is applied at a range of rates of about 8 gallons/acre to about 35 gallons/acre.

A further object of the present invention is to provide a method for fumigating including the step of applying fumigant to new plantings, existing crops, or additional crops planted in the same beds without disturbing the soil profile.

Further objects and advantages of the present invention will become apparent from following description.

BRIEF DESCRIPTION OF THE DRAWINGS

FIG. 7 is a drawing of blade 23 showing inner tapered beveled edge 23a, welded end 23b, outer end 23c, feed tube 26, and opening 26a.

DETAILED DESCRIPTION OF THE INVENTION

Fumigation System 30 applies fumigants under existing planting beds that have been covered by plastic mulch without disturbing their integrity, without damaging the plastic, and without using drip irrigation. The present invention mitigates exposure of workers to chemical fumigants and the impacts of manufacturer label restrictions requiring the use of Personal Protective Equipment (PPE) by workers present in the field during fumigant application because it permits the fumigation process to be separated from procedures required for preparation of the planting beds. It restricts the application of fumigants to the planting bed, reducing the overall quantity of fumigants applied to a field. Furthermore, the present invention improves the effectiveness of fumigants by facilitating their use with virtually-impermeable films and/or a pre-soil solarization treatment.

Soil fumigation is a critical component of high value horticultural crops cultivated on raised, plastic-mulched planting beds. Traditionally, fumigants are shank injected into fields in advance of bed preparation procedures (broadcast fumigation), shank injected into planting beds as they are being prepared (bed fumigation), or injected through drip irrigation systems after beds have been prepared (drip irrigation).

While effective, broadcast fumigation is not practical for growers needing to fumigate established plastic-mulched beds prior to their use for a second (double) crop. Broadcast fumigation increases fumigant use because entire fields are treated including the row middles where crops are not cultivated. Rapid emission of soil-applied fumigants into the atmosphere can cause environmental problems, prompting further restrictions on their use. For example, high concentrations of the fumigant 1,3-dichloropropene in the air near fumigated fields prompted a four-year suspension of its use in California in 1990.

During bed fumigation, workers are required in the field to assist with preparation of planting beds. Several fumigant manufacturers require workers to wear personal protective equipment (PPE) including chemical-resistant gloves, footware, coveralls, socks, and a respirator with an organic-vapor-removing cartridge. Logistical and economic constraints associated with outfitting hundreds of workers with PPE and the potential for heat related illnesses caused by their use in the summer months make conventional bed fumigation undesirable for fumigants with PPE restrictions.

Application of fumigants under virtually impermeable films (VIF) or following a soil solarization treatment has been shown to significantly improve their effectiveness. A presolarization treatment is not compatible with broadcast fumigation or bed fumigation.

Injection of fumigants through drip irrigation systems has been shown to be effective. However, many growers do not have access to drip irrigation systems. For example, approximately 50 percent of the 59,400 acres of fresh market tomato and pepper produced in Florida under fumigated soil are not drip irrigated and thus cannot access this technology.

Therefore, there is a need to deliver fumigants to the interior of raised, plastic mulched beds without disturbing the integrity of the beds and in a manner that is compatible with the use of a presoil solarization and/or virtually impermeable films (VIF) and not dependant upon the presence of a drip irrigation system.

The following detailed description is based on modification of a Yetter 30" Avenger deep placement coulter system as a model system. However, given the following detailed description, one of ordinary skill in the art could readily modify any deep placement coulter system to practice the claimed invention. It is also easily adaptable to fit various planting configurations and cropping requirements.

Figure 1:
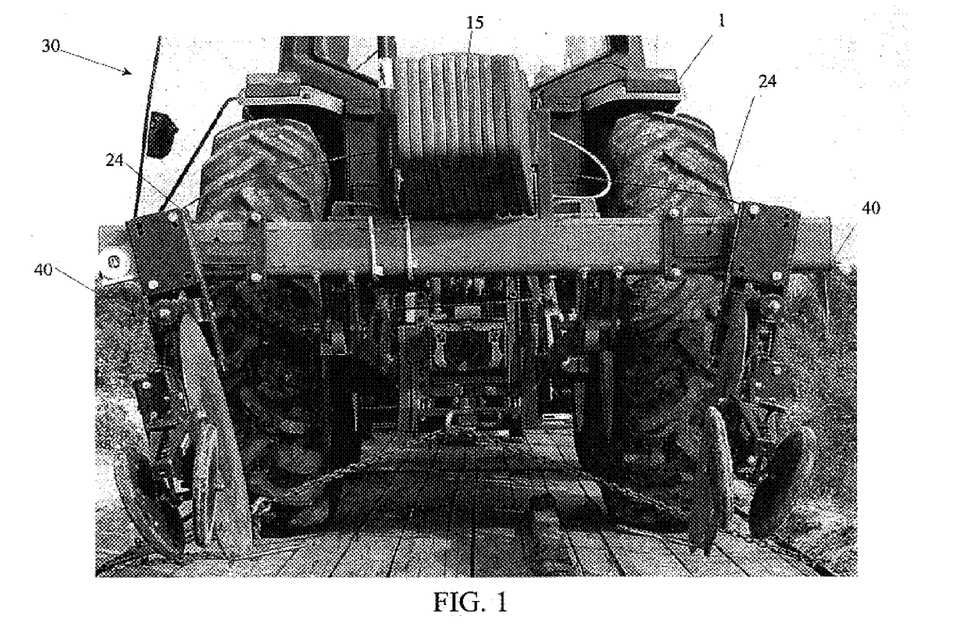
FIG. 1 is a drawing showing the rear view of fumigation system 30 including tractor 1, armatures 40, weights 15, toolbar 70, and mounting arm 24.
Figure 2:
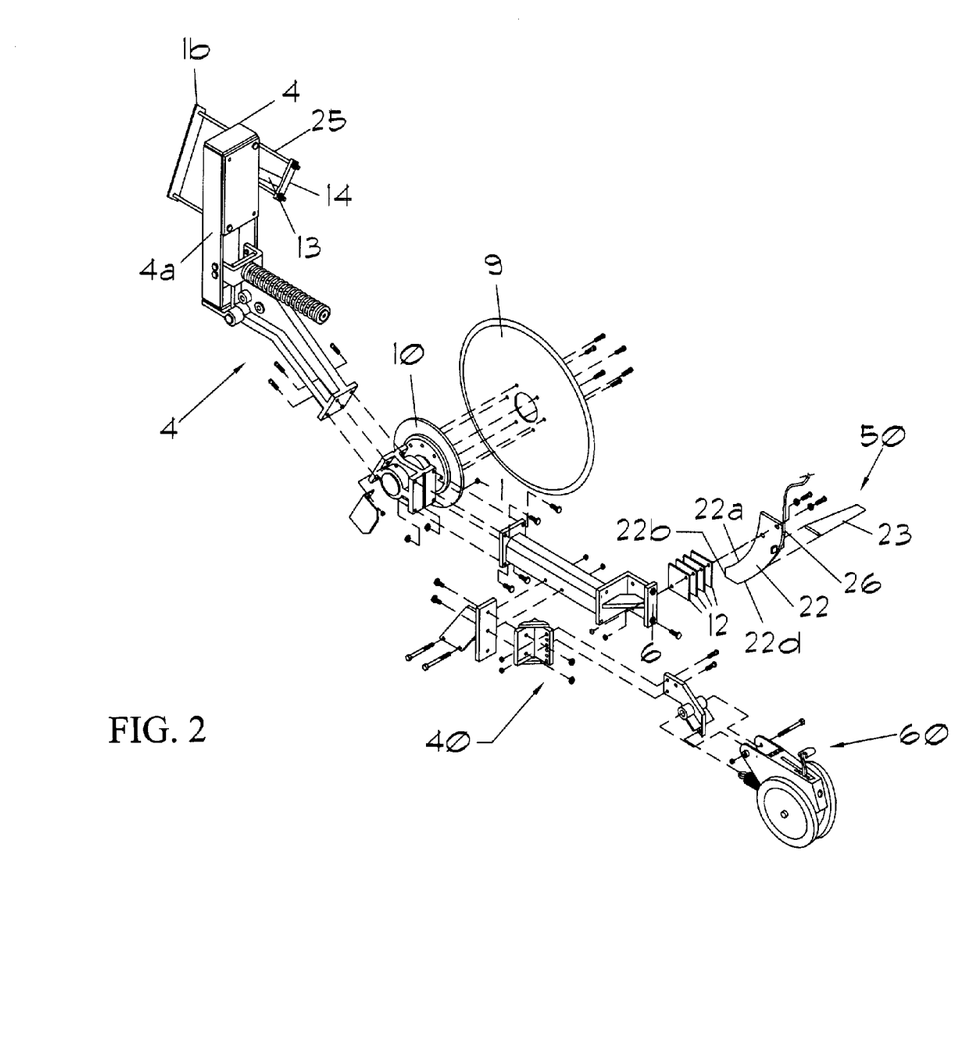
FIG. 2 is a drawing of an armature 40 showing mounting arm 24 including mounting bracket 13 and support bracket 14, means for attaching 25, fumigant dispersal assembly 50, and close wheel assembly 60.
Figure 3:
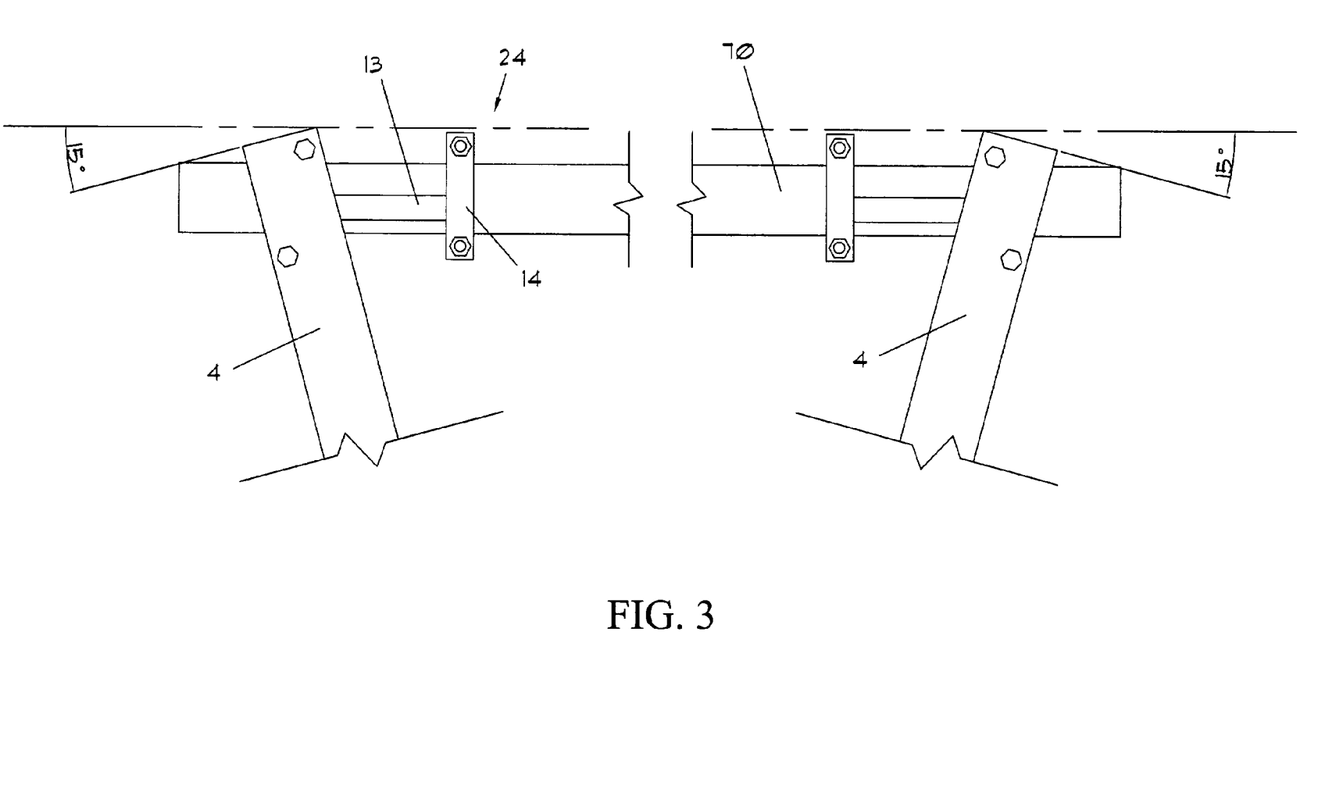
FIG. 3 is a drawing showing mounting detail including toolbar 70, mounting arm 24 including mounting bracket 13, support bracket 14, and 15° angle of the armature.

Fumigation system 30 includes tractor 1, a fumigant tank (not shown), down-pressure weights 15, toolbar 70, and two opposing armature systems 40 for injecting fumigant into both sides of a mulched planting bed simultaneously (FIG. 1). Each armature system 40 includes a main arm assembly 4, a hub and spindle assembly 10, a close wheel assembly 60, and a fumigant dispersal assembly 50 (FIG. 2). Each armature system 40 is adjustably mounted to toolbar 70 at an angle which allows maximum fumigation under a planting bed (FIGS. 2 and 3). An angle of about 10° to about 20° facilitates optimum fumigant injection and less stress to injection blade 23. An angle greater than about 20° will cause more disturbance of the plastic mulch and more stress on the hub and spindle assembly 10. An angle less than about 10° will cause fumigation outside the bed zone. Vertical mounting at a 0° angle does not allow the fumigant or injection blade 23 to reach up into the bed, resulting in movement of the fumigant into the row middle. Also, vertical mounting results in a horizantal position of fumigant injection blade 23, subjecting it to extreme stress from the resistance at the soil as it is dragged through the field, increasing the potential for bending or breakage of blade 23. A preferred angle is about 15° Weights 15 are mounted on the tractor to facilitate penetration of blade 23 into the ground so that the plastic mulch is not disturbed and fumigant is applied at the desired depth. Up to about 500 pounds of weight per coulter blade 9 can be added to the tractor to achieve desired depth for fumigant application.

Figure 4:
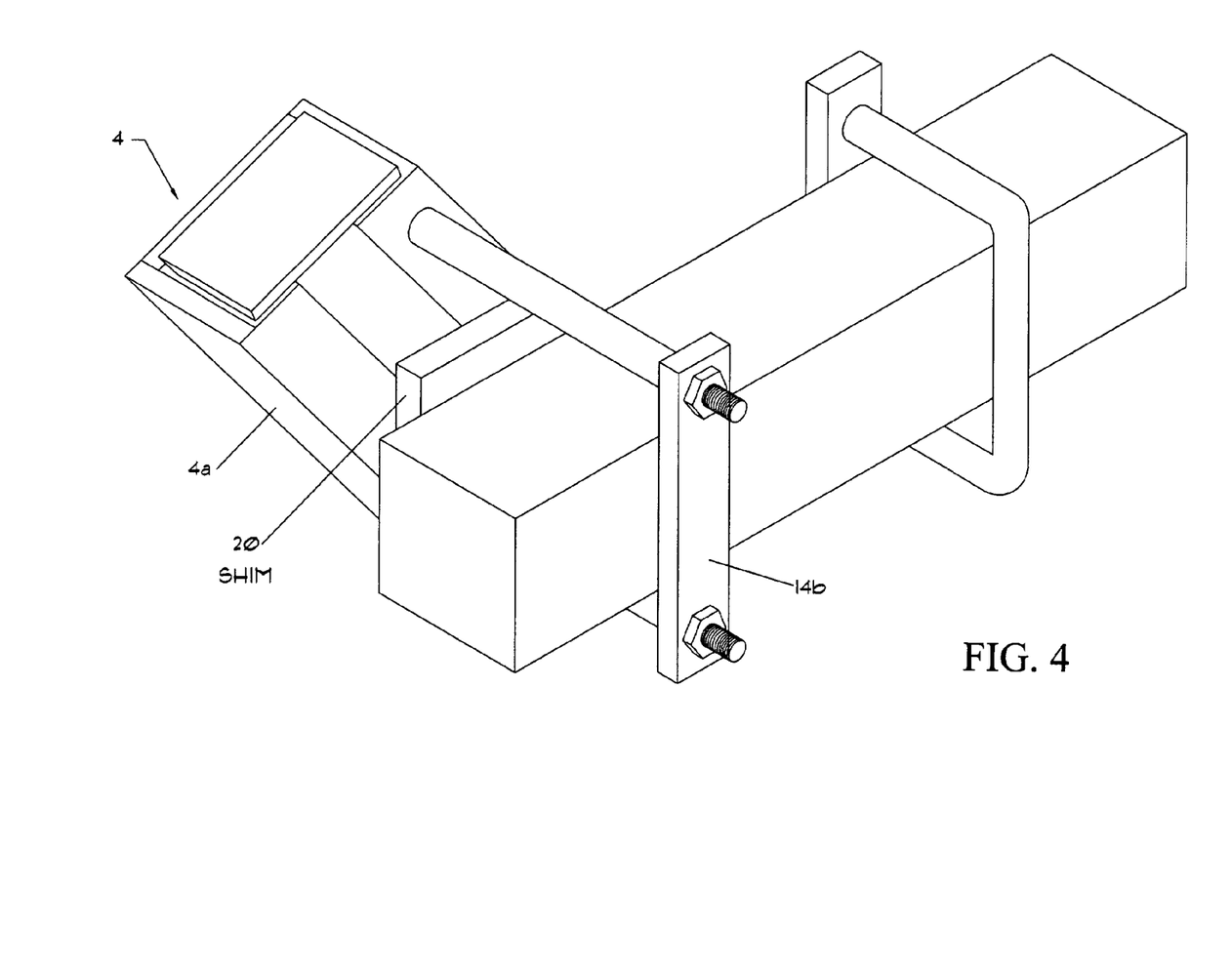
FIG. 4 is a drawing showing the location of shim 20 in relation to toolbar 70 and armature 40, specifically shim 20, attachment plate 4a, toolbar 70, and mounting strap 14b.

Main arm assembly 4 is any arm assembly of a coulter system. Main Arm assembly 4 is modified by permanently attaching, such as by welding, a means for attaching a coulter arm assembly, such as for example an attachment plate 4a of arm assembly 4, to mounting bracket 13 of mounting arm 24 at about a 10° to about a 20° angle, 15° preferable, from vertical to improve fumigant movement, increase wing angle (the angle of blade 23), and reduce drag. Angles from about 10° to about 20° are useful for the present invention. Bracket 13 is permanently attached to support bracket 14 by welding for example. Support bracket 14 is removably attached to toolbar 70 using any means for removably attaching 25 such as, for example, a square U-bolt. This allows armatures 40 to be adjusted to conform to beds of varying widths. Armatures 40 are removably attached to toolbar 70 through mounting strap 14b which is located on one side of toolbar 70 and affixed to attachment plate 4a, on the opposite side of toolbar 70, with bolts. Mounting bracket 13 further includes a shim 20 placed between attachment plate 4a of arm assembly 4 and tool bar 70 to create about a 5° variation in the horizontal direction of each armature 40 for a change in width of the knife slot (opening in soil created by coulter blade) and to reduce drag (FIG. 4). One of ordinary skill in the art could readily determine how to adjust the variation in horizontal direction of armature 40 to any degree to change the width of the knife slot and to reduce drag for any soil condition give the detailed description of the present invention. Shim 20 is made of any non-compressible material, preferably flat steel, of about ⅛×1½×9 inches. One of ordinary skill in the art could readily determine the size of shim 20 to achieve the desired variation in the horizontal direction of armature 40.

Figure 5:
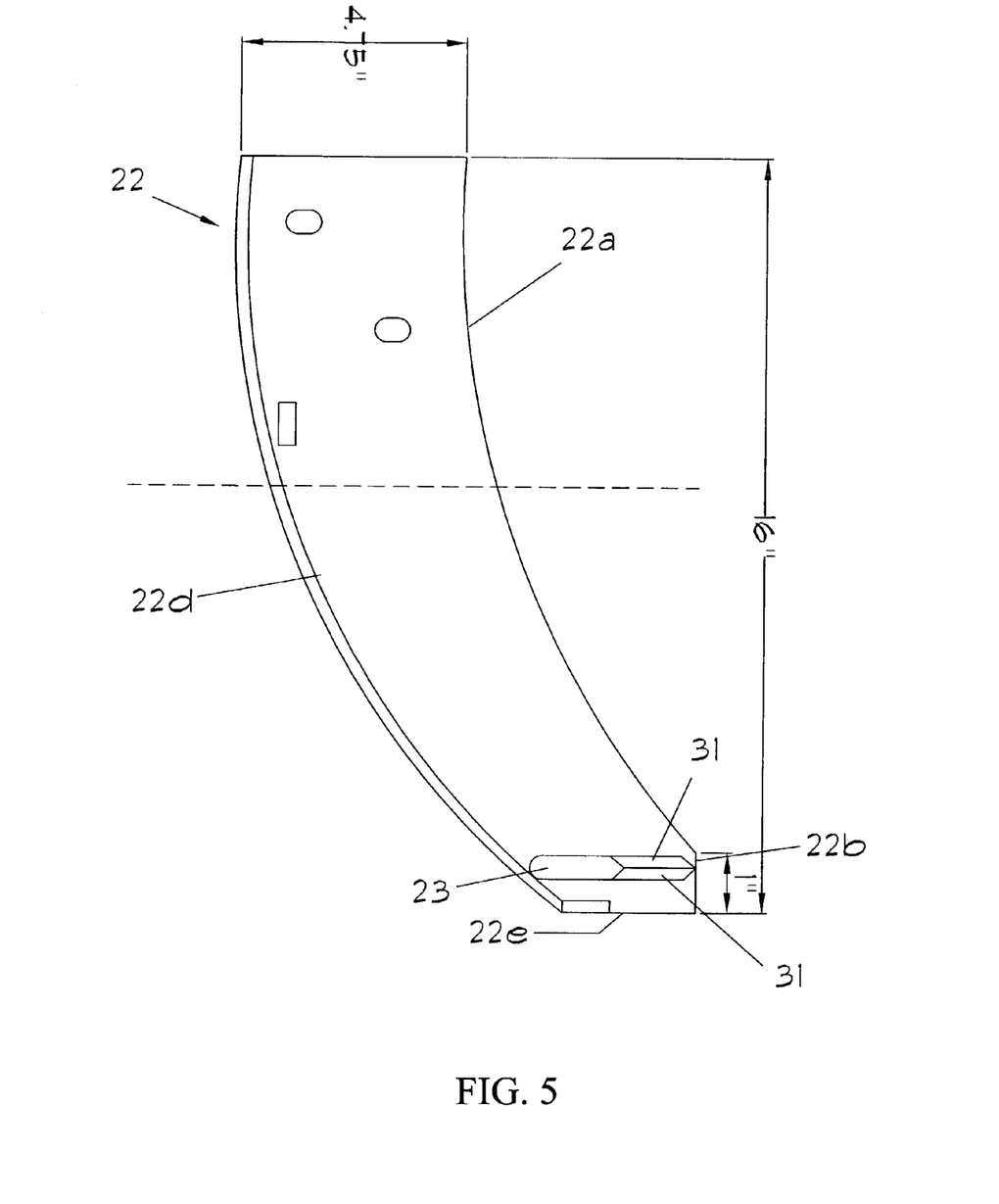
FIG. 5 is a drawing of knife 22 showing contoured surface 22a, blunt knife tip 22b, knife bottom 22e, rear facing edge 22d, feed tube 26, blade 23, and double kerf 31.
Figure 6:
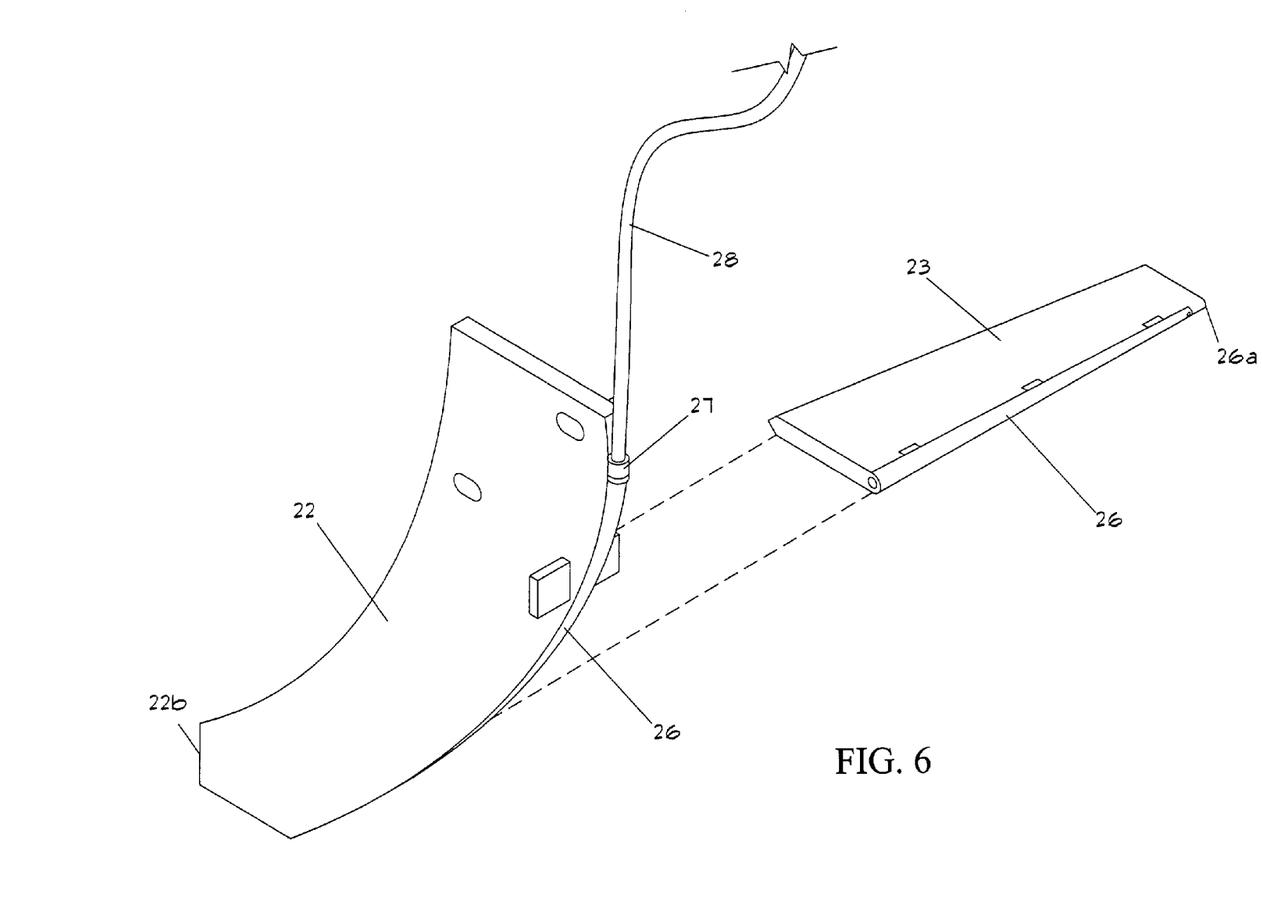
FIG. 6 is a drawing of knife 22 showing a side view of knife 22 and blade 23 with feed tube 26.
Figure 7:
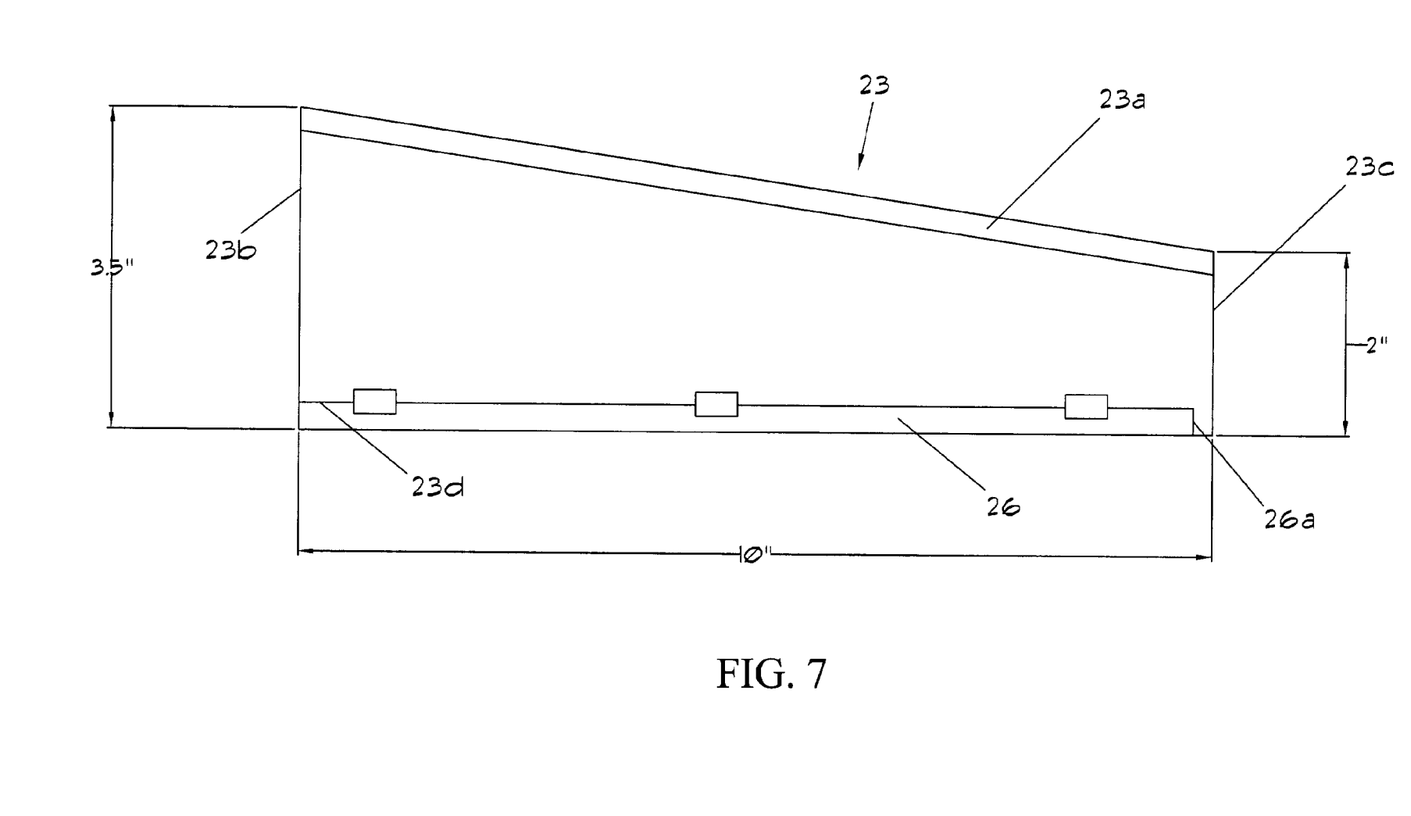

Fumigant dispersal assembly 30 includes a fumigant tank, a conduit 28 operatively connected to the tank, fitting 27 operatively connecting conduit 28 to feed tube 26 and feed tube 26. Assembly 30 further includes knife 22 and blade 23. Knife 22 is removably attached to knife arm 6 using shims 12 as needed to align knife 22. Any means for attaching 25 such as, for example, bolts, is within the ordinary skill of the art. Knife 22 is adjusted to align behind blade 9 using shims 12. Knife 22 is adjusted left and right to make the tip of knife 22 close, about ⅛" to coulter blade 9. Knife 22 is approximately 16 inches long, about 4.75 inches wide, has contoured surface 22a which roughly conforms to the arc of the circular perimeter of coulter blade 9, and has blunt tip 22b which allows trash to clear under knife 22 (FIG. 5). Knife 22 includes feed tube 26 which can be, for example, an ⅛" 316 stainless steel pipe, welded to the back edge of knife 22 and the outer edge of blade 23 to within about ¾" from end of blade 23 (FIG. 6). Feed tube 26 bends 90° at point of knife 22 and blade 23 intersection about and runs to about ¾" from end of knife 23. Tube 26 has an opening 26a at its end of about ⅛" diameter for fumigant dispersal. Fitting 27, located at the top of tube 26, allows frictional attachment of conduit 28. Conduit 28 delivers fumigant from fumigant tank (not shown) and can be any conduit which is non-reactive to the fumigant such as, for example, heavy wall cross link poly hose. Conduit 28 extends from fumigant tank out to armature 4, threads into attachment plate 4a of armature 4, passes along the outside of arm assembly 4 and over knife arm 6 to fitting 27 (FIGS. 1 and 2). Knife 22 has an associated beveled fumigant injection blade 23 which is permanently attached to the inner side of knife 22 at about a 90° angle from knife 22 vertical, about one inch from bottom 22e. Outer-facing edge of blade 23 is flush with rear-facing edge 22d of knife 22 (FIG. 7). The inner edge 23a of blade 23 is tapered and beveled such that the welded end 23b of blade 23 is approximately 3.5 inches and the outer end 23c is approximately 2 inches. The bevel is an approximately ¾" double kerf 31. Knife 22 and associated blade 23 are constructed of steel, however, substitution of other materials such as, for example, abrasion resistant steel, is well within the ordinary skill in the art.

In operation, armatures 40 are removably attached to toolbar 70 of tractor 1 and adjusted for bed width. Conduit 28 is attached to fitting 27 to supply fumigant from fumigant tank to feed tube 26. Tractor 1 moves over raised, plastic-mulched beds at speeds useful for applying fumigants at a depth of about 6 inches below the soil surface of the row middle and about 3 inches towards the interior center of the bed. The distance towards the interior center of the bed is equal to the length of blade 23. The device is designed to operate at speeds of between about 3 and about 5 miles per hour, with 4 miles per hour the preferred speed. The knife extends under the bed and reaches up into the interior of the bed to clear the plastic mulch that is tucked in the soil. Up to about 500 pounds per blade 9 of weights can be added to get the desired depth for fumigant application.

Throughout this application, various publications are referenced. The disclosures of these publications in their entireties are hereby incorporated by reference into this application in order to more fully describe the state of the art to which this invention pertains.

The following examples are intended to further illustrate the invention and are not intended to limit the scope of the invention as defined by the claims.

EXAMPLE 1

Fall 2001, at USDA, ARS Header Canal Research Farm located in St. Lucie County, Florida, the soil fumigant Telone C35 (65% 1,3-D and 35% chloropicrin) was applied using fumigation system 30 of the present invention. The soil type was a Riviera fine sand (93% sand, 4% silt, and 3% clay) with an organic matter content of less than about 2% and a pH of about 6.9. Application of the fumigant was evaluated in combination with low density, polyethylene (LDPE), virtually impermeable films (VIF), and/or a 7-day pre-soil solarization period (Table 1).

The white LDPE film was 1.2 mil in thickness, embossed, coextruded, white on black film and considered the industry standard. The clear and black VIF were 1.4 mil thick (Hytibarrier flex, Klerks Plastic Co.). The clear LDPE film was 1.2 mil in thickness and embossed.

Treatments were arranged in a randomized complete block design and replicated four times. Each replicate plot was a single row, 100 feet long. Rows were arranged on about 6 foot centers. Bed dimensions were about 32 inches wide and about 10 inches high. At about 7 days after application the plastics were painted white with a latex based paint (Kool Grow, SunTec Paints). Twenty-five tomato (Florida 91) and twenty-five pepper (Enterprise) seedlings were transplanted into the center of each replicate plot using about a 2 foot spacing. The crops were maintained using standard production practices.

Concentrations of 1,3-D in the soil air spaces were measured using a Gastec Model GV-100 gas sampling pump with #139 dichloroethylene detector tubes (Gastec Corporation, Ayase-City, Japan). A 2× correction factor was used to adjust the tube reading for 1,3-dichloropropene. Samples were collected at about 8-inch increments across the beds and row middles at about 24, 48, and 72 hours after application. Survival of Fusarium oxysporum f.sp. lycopersici and Phytophthora capsici in the bed centers was determined by burying bags containing innoculum at about a 2 inch depth. The effect of the fumigant application on weed populations, soilborne diseases and plant parasitic nematodes was monitored over the course of the season. The effect of the fumigant application on marketable yield was determined from multiple harvests.

Figure 8:
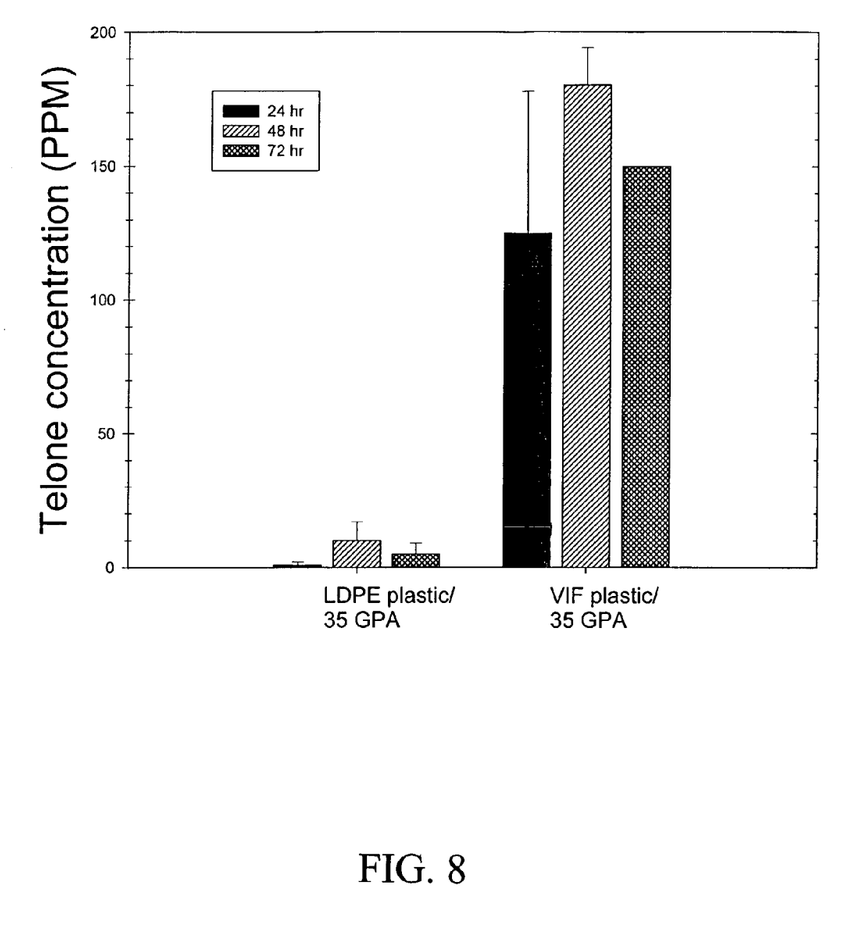
FIG. 8 is a graph showing the concentration of 1,3-dichloropropene, when applied in a mixture with chloropicrin (Telone C-35) at a rate of about 35 gallons per acre (broadcast equivalent) under raised beds covered by LDPE (low density polyethylene) or VIF (virtually impermeable film) following application with fumigation system 30.

Fumigation System 30 was able to apply Telone C35 underneath the raised, plastic mulched beds without disturbing the integrity of the beds. The beds remained intact for the duration of the growing season, indicating no disruption of their internal structure. Applications were made at a tractor speed of about 4 miles per hour, which is considered satisfactory for pesticide application. No physical wear was observed on any components of the system during or after the experiment, indicating the durability of the device. Under the VIF, concentrations of Telone (1,3-D) reached a maximum of about 180 ppm at about 48 hours after application (FIG. 8). This concentration is well above levels needed for effective control of several key plant pathogenic fungi and nematodes. Concentrations of Telone C35 under the LDPE film remained less than 12 ppm, an indication of the relative permeability of LDPE to the diffusion of 1,3-D into the atmosphere.

Figure 9:
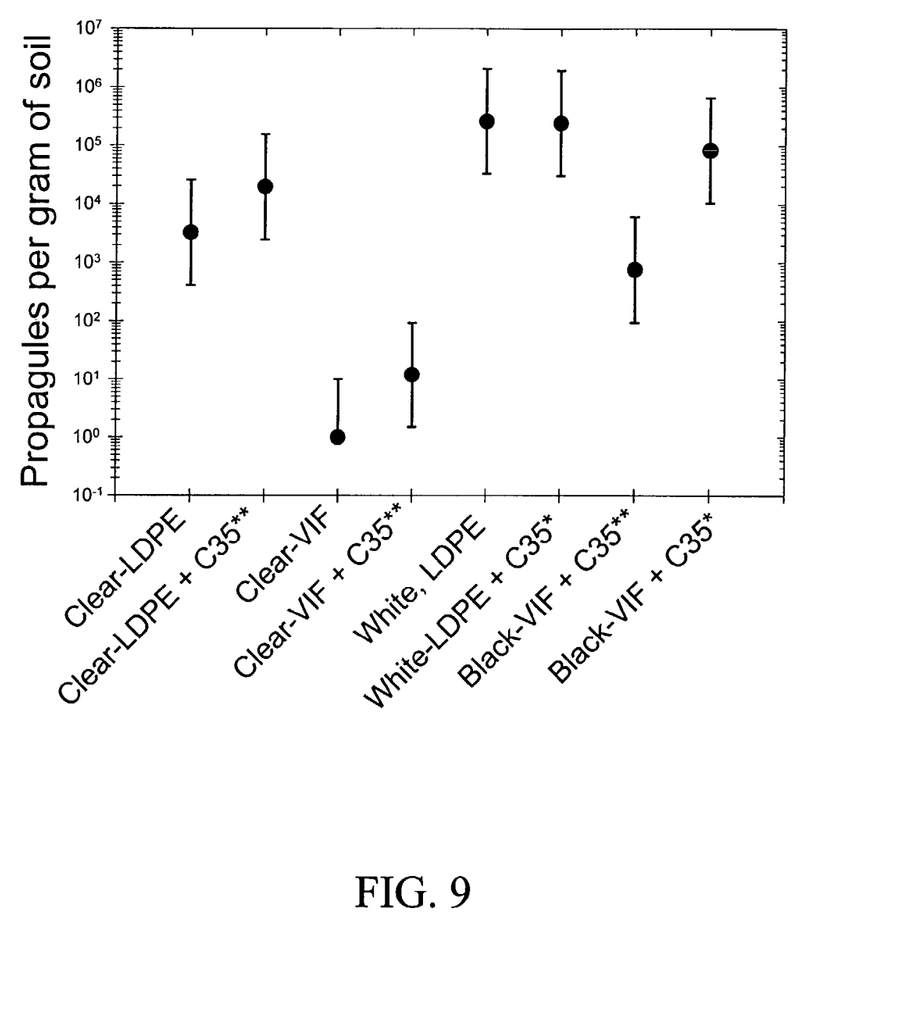
FIG. 9 is a graph showing survival of *Fusarium oxysporum f.* sp. *lycopersici* under different combinations of the fumigant Telone C35 (61% 1.3-dichloropropene:35% chloropicrin), plastic film, and soil solarization treatments using fumigation system 30. All clear films received about a 7-day soil solarization period prior to fumigation.
Figure 10:
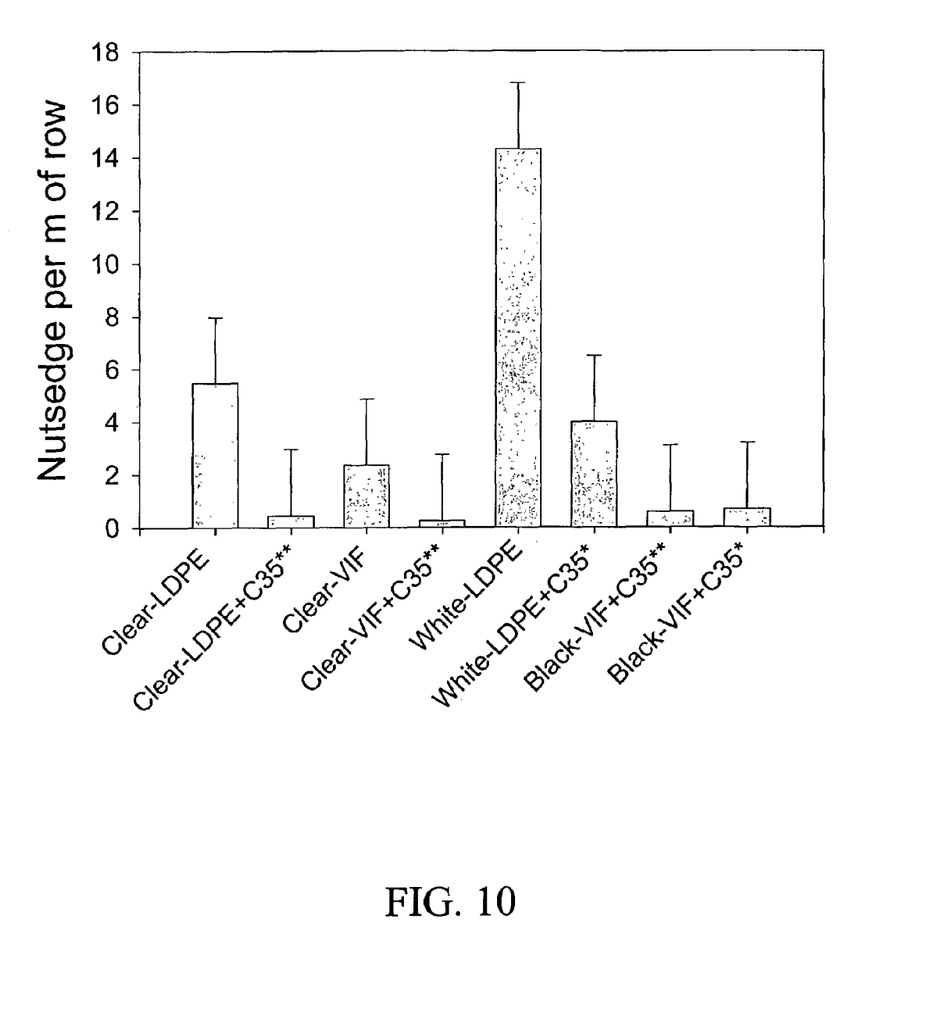
FIG. 10 is a graph showing emergence of nutsedge sprouts (*Cyperus* spp.) under different combinations of fumigant (Telone C35), plastic film, and a soil solarization treatment using fumigation system 30. All clear films received about a 7-day soil solarization period prior to fumigation.
Figure 11:
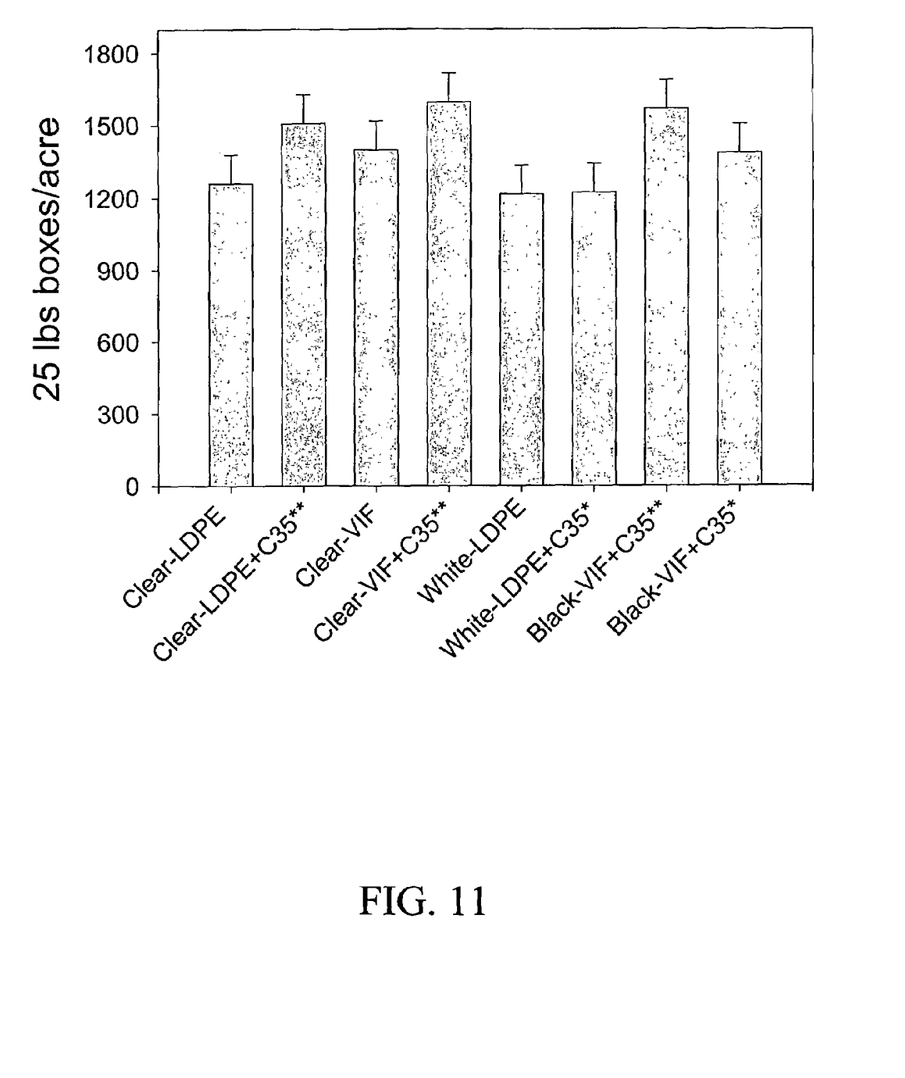
FIG. 11 is a graph showing marketable yields of tomato (cv. Florida 47) under different combinations of fumigant (Telone C35), plastic films, and soil solarization using fumigation system 30. All clear films received about a 7-day soil solarization period prior to fumigation.
Figure 12:
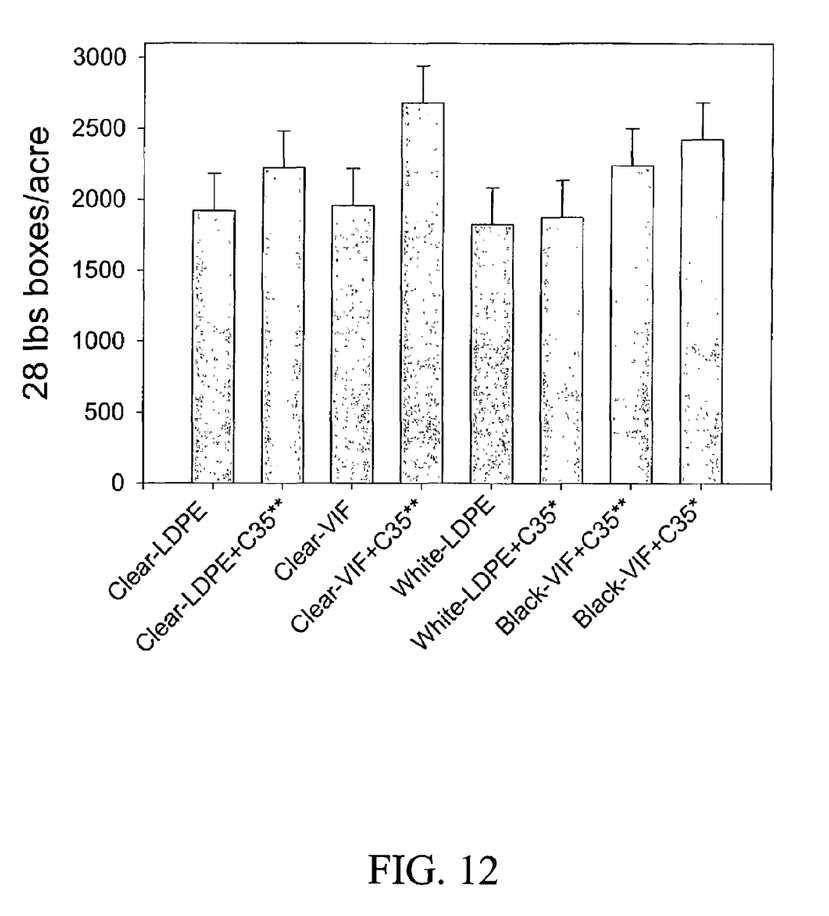
FIG. 12 is a graph showing marketable yields of pepper (cv. Enterprise) under different combinations of a fumigant (Telone C35), plastic film, and soil solarization using fumigation system 30. All clear films received about a 7-day soil solarization period prior to fumigation.

Survival of *F.o. lycopersici* was significantly reduced when fumigant applications were combined with VIF or a 7-day pre-soil solarization period (FIG. 9). The number of yellow and purple nutsedge sprouts that emerged through the plastic mulch was significantly reduced by the Telone C35 applications even under the LDPE film (FIG. 10). Marketable yield of tomato was highest in treatments where fumigants were applied under VIF or following a 7 day pre-soil solarization treatment (FIG. 11, Table 2). The same general trend was observed for pepper yields (FIG. 12, Table 2).

TABLE 1

| Treat-ment | Plastic | Telone C35 rate* | Telone C35 Timing | Solarization Treatment |
|---|---|---|---|---|
| 1 | clear, LDPE** | 0 gal/A | — | 7 days |
| 2 | clear, LDPE | 35 gal/A | 7 day delay | none |
| 3 | clear, VIF | 0 gal/A | — | none |
| 4 | clear, VIF | 35 gal/A | 7 day delay | 7 days |
| 5 | white, LDPE | 0 gal/A | — | 7 days |
| 6 | white, LDPE | 35 gal/A | at bed formation | none |
| 7 | black, VIF | 35 gal/A | 7 day delay | none |
| 8 | black, VIF | 35 gal/A | at bed formation | none |

*broadcast acre rate
**LDPE = ; low density polyethylene film, VIF = virtually impermeable film

TABLE 2

Market Yield After Three Harvests

| Treatment (Plastic + Fumigant) | Pepper lbs/plant | Pepper boxes/acre* | Tomato lbs/plant | Tomato boxes/acre* |
|---|---|---|---|---|
| Clear LDPE | 3.1a | 477 | 8.1ab | 1260 |
| Clear LDPE + Telone C35** | 3.6a | 522 | 9.7bc | 1508 |
| Clear VIF | 3.1a | 486 | 9.0abc | 1340 |
| Clear VIF + Telone C35** | 4.3a | 665 | 10.3c | 1598 |
| White/Black LDPE | 2.9a | 452 | 7.8a | 1215 |
| White/Black LDPE + Telone C35*** | 3.0a | 465 | 7.9a | 1222 |
| White/Black VIF + Telone C35** | 3.6a | 556 | 10.1c | 1569 |
| White/Black VIF + Telone C35*** | 3.9a | 601 | 8.9abc | 1386 |

*Based on a plant density of about 4347 plants/acre (6 foot row spacing with 20 inch plant spacing.
**Telone C35 applied at about 35 gal/acre broadcast rate same day as plastic
***Telone C35 applied at 35 gal/acre broadcast rate 7 days after plastic application.
Clear plastic painted white about 7 days after plastic application.
Means followed by the same letter are not significantly different according to LSD (P = 0.10).

The foregoing detailed description is for the purpose of illustration. Such detail is solely for that purpose and those skilled in the art can make variations therein without departing from the spirit an scope of the invention.

INDEX OF THE ELEMENTS

1. Tractor
4. Main Arm Assembly
4a. Attachment Plate
6. Knife Arm
9. Coulter Blade
10. Hub and Spindle Assembly
12. Knife Shim
13. Mounting Bracket
14. Support Bracket
14b. Mounting Strap
15. Weights
20. Shim
22. Knife
22a. Contoured Surface
22b. Blunt Tip
22d. Rear Facing Edge
22e. Knife Bottom
23. Blade
23a. Inner Tapered, Beveled Edge
23b. Welded End
23c. Outer End
23d. Outer Facing Edge
24. Mounting Arm
25. Means for Attaching
26. Feed Tube
26a. Opening
27. Fitting
28. Conduit
30. Fumigation System
31. Double Kerf
40. Armature System
50. Fumigant Dispersal Assembly
60. Close Wheel Assembly
70. Toolbar

We claim:

1. An apparatus for applying a soil fumigant under plastic mulched planting beds comprising:
    a. two opposing armature systems adjustably mounted to a tool bar of a tractor at an angle to permit application of a fumigant to a plastic mulched planting bed without disturbing said plastic mulch wherein said armature systems further include shims to vary horizontal direction of said armatures to vary knife slot width and reduce drag, and
    b. a fumigant dispersal assembly comprising a fumigant tank operatively connected to a knife wherein said knife is blunt tipped and has a beveled fumigant injector blade.

2. An adjustable armature system for applying fumigants to a plastic mulched bed comprising:
    a. means for moveably mounting a coulter arm assembly to a tractor tool bar at an angle to permit application of a fumigant to a plastic mulched planting bed without disturbing said plastic mulch,
    b. a fumigant dispersal assembly comprising a fumigant tank operatively connected to a knife wherein said knife is blunt tipped and has a beveled fumigant injector blade; and
    c. a shim to vary horizontal direction of said armature to vary the knife slot width and reduce drag of said armature system.

3. An adjustable armature system for applying fumigant to a plastic mulched planting bed comprising:
    a. means for removeably mounting a coulter arm assembly to a tractor tool bar at an angle to permit application of a fumigant to a plastic mulched planting bed without disturbing said plastic mulch wherein said means includes a mounting arm comprising a mounting bracket attached to a support bracket and a means for removeably attaching said mounting arm to said tool bar, and
    b. a fumigant dispersal assembly comprising a fumigant tank operatively connected to a knife wherein said knife is blunt tipped and has a beveled injector blade.

4. The system of claim 3 further comprising a shim located between said tool bar and an attachment plate of said mounting arm; wherein said shim allows variation in the horizontal direction of said armature to vary knife slot width and reduce drag of said armature system.

5. An apparatus for applying a soil fumigant under plastic mulched planting beds consisting essentially of:
    a. two opposing armature systems adjustably mounted to a tool bar of a tractor at an angle to permit application of a fumigant to a plastic mulched planting bed without disturbing said plastic mulch wherein said armature systems further include shims to vary horizontal direction of said armatures to vary knife slot width and reduce drag, and
    b. a fumigant dispersal assembly consisting of a fumigant tank operatively connected to two knifes wherein each of said knifes is blunt tipped and has a beveled fumigant injector blade.

6. An adjustable armature system for applying fumigants to a plastic mulched planting bed consisting essentially of:
    a. means for moveably mounting a coulter arm assembly to a tractor tool bar at an angle to permit application of a fumigant to a plastic mulched planting bed without disturbing said plastic mulch wherein an adjustable armature system further includes a shim to vary knife slot width and reduce drag; and
    b. a fumigant dispersal assembly consisting of a fumigant tank operatively connected to two knifes wherein each of said knifes is blunt tipped and has a beveled fumigant injector blade.

* * * * *